(12) United States Patent
Ragnoni et al.

(10) Patent No.: US 11,151,838 B2
(45) Date of Patent: *Oct. 19, 2021

(54) BLOCKCHAIN-BASED SMART CONTRACT INSTANT LOTTERY TICKET

(71) Applicant: IGT Global Solutions Corporation, Providence, RI (US)

(72) Inventors: Gianluca Ragnoni, Rome (IT); Fabrizio Battini, Rome (IT); Emanuele Martire, Rome (IT); Thomas K. Oram, Hudson, MA (US)

(73) Assignee: IGT GLOBAL SOLUTIONS CORPORATION, Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/566,229

(22) Filed: Sep. 10, 2019

(65) Prior Publication Data

US 2021/0074120 A1 Mar. 11, 2021

(51) Int. Cl.
*G07F 17/32* (2006.01)
*H04L 9/06* (2006.01)

(52) U.S. Cl.
CPC ........ *G07F 17/3241* (2013.01); *G07F 17/329* (2013.01); *H04L 9/0637* (2013.01); *H04L 9/0643* (2013.01); *H04L 2209/38* (2013.01)

(58) Field of Classification Search
CPC ...... G06F 21/64; G07F 17/326; G07F 17/329; G07F 17/3241; H04L 2209/38; H04L 63/12; H04L 67/104; H04L 9/006; H04L 9/0637; H04L 9/0643; H04L 9/0825; H04L 9/321; H04L 9/3239; H04L 9/3247
See application file for complete search history.

(56) References Cited

U.S. PATENT DOCUMENTS 6,685,562 B1  2/2004 Rantanan
2002/0188845 A1* 12/2002 Henderson ......... G06Q 20/3829
713/168

(Continued)

FOREIGN PATENT DOCUMENTS

CN   105913174 A   8/2016
CN   106504174 A   3/2017

(Continued)

OTHER PUBLICATIONS

N. Szabo, "Smart Contracts: Building Blocks for Digital Markets", http://www.fon.hum.uva.nl, retrieved Feb. 10, 2019, 11 pages.

(Continued)

*Primary Examiner* — Justin L Myhr
(74) *Attorney, Agent, or Firm* — Sage Patent Group

(57) ABSTRACT

A ticket issuer server provides a digital instant lottery ticket, such as a smart contract instant lottery ticket (SILT) on a digital ledger, such as a blockchain infrastructure that supports execution of smart contracts. The ticket issuer server obtains an encryption key from a key issuer, encrypts a prize code with the encryption key to provide an encrypted prize code, creates an object, such as a smart contract representing the SILT, wherein the smart contract includes a ticket owner address attribute, a ticket issuer address attribute, a key issuer address attribute and the encrypted prize code, and stores the object on the digital ledger.

31 Claims, 13 Drawing Sheets

(56) References Cited

U.S. PATENT DOCUMENTS

| | | | | |
|---|---|---|---|---|
| 2003/0120611 | A1* | 6/2003 | Yoshino | G06Q 20/3674 705/67 |
| 2004/0176154 | A1* | 9/2004 | Finnochio | G07F 17/32 463/3 |
| 2005/0262338 | A1* | 11/2005 | Irwin, Jr. | H04L 63/12 713/155 |
| 2007/0026926 | A1* | 2/2007 | Romanik | A63F 3/0605 463/17 |
| 2015/0339886 | A1* | 11/2015 | Pinkus | G07F 17/3218 463/25 |
| 2018/0096752 | A1* | 4/2018 | Ovalle | G07F 17/3209 |
| 2018/0247191 | A1* | 8/2018 | Katz | G06N 3/08 |

FOREIGN PATENT DOCUMENTS

| | | |
|---|---|---|
| CN | 108805664 A | 11/2018 |
| CN | 108831002 A | 11/2018 |
| KR | 101928087 B1 | 2/2019 |
| WO | WO2017184913 A1 | 10/2017 |

OTHER PUBLICATIONS

V. Buterin, "A Next Generation Smart Contract & Decentralized Application Platform", Ethereum White Paper, http://blockchainlab.com, retrieved Dec. 10, 2018, 36 pages.

P. Ruiz, "Sellable Contracts", ERC #798, https://github.com/ethereum/EIPs/issues/798, Dec. 13, 2017 (downloaded Sep. 6, 2019) 5 pages.

J. Chow, "Technical Introduction to Events and Logs in Ethereum", ConsenSys, Jun. 6, 2016, httis://media.consensys.net/technicalintroduction-to-events-and-logs-in-ethereum-a074d65dd61e, 8 pages.

J. Dourlens, "Getting data from the internet with Oraclize", Ethereum Developers, Sep. 28, 2017, https://ethereumdev.io/getting-data-internetoraclize/, 11 pages.

www.firelotto.com, copyright © 2018, Fire Lotto, 1 page.

Intellectual Property Office of Great Britain, Search Report, Application No. GB1903234.1, dated Aug. 30, 2019, 8 pages.

\* cited by examiner

```
constructor () public {
        owner = msg.sender;
        issuer = msg.sender;
        ownerCandidate = address(0);
        //keyIssuer --> must be initialized with the KI
        state = Lifecycle.sellable;
        //costAmount --> must be initialized with the ticket cost
        //winningAmount --> must be initialized with an encrypted value
}
```

FIGURE 3

```
function initiateSale (address payable _destination) onlyOwner public {
        require (_destination != address(this) && _destination != owner);
        ownerCandidate = _destination;
        state = Lifecycle.selling;
}
```

FIGURE 4

```
function confirmSale () onlyOwnerCandidate public payable {
        require (msg.value == costAmount);
        address payable prevOwner = owner;
        owner = ownerCandidate;
        prevOwner.transfer(msg.value);
        state = Lifecycle.sellable;
}
```

FIGURE 5

```
function abortSale () onlyOwnerorOwnerCandidate public {
      ownerCandidate = address(0);
      state = Lifecycle.sellable;
}
```

FIGURE 6

```
function initiateScratch(string memory _keyPub) onlyOwner public {
      state = Lifecycle.scratching;
      keyPub = _keyPub;
} function confirmScratch () onlyKeyIssuer public {
      state = Lifecycle.scratched;
      //decrypt winningAmount
}
```

FIGURE 7

```
function initiateRedeem() onlyOwner public {
    state = Lifecycle.redeeming;
} function confirmRedeem() onlyIssuer public {
      require(msg.value == winningAmount);
      address payable prevOwner = owner;
      owner = issuer;
      prevOwner.transfer(winningAmount);
      state = Lifecycle.redeemed;
}
```

FIGURE 8

BLOCKCHAIN-BASED SMART CONTRACT INSTANT LOTTERY TICKET

BACKGROUND

The inventive concepts disclosed herein relate to the generation, transfer and redemption of digital instant lottery tickets.

An instant lottery (or scratch off lottery) is a lottery game which features tickets that have the winning (or losing) numbers concealed on the game card itself. The winning numbers are typically hidden by a coating, which is removed by rubbing. By removing the coating, the owner of the ticket can instantly determine the ticket's winning status instead of waiting for a matching number to be drawn.

Since the cash value of the ticket is determined at the time of printing, the tickets must be designed and manufactured with extraordinary security precautions to avoid ticket fraud. Moreover, a winning ticket is a bearer instrument that can be easily lost or stolen prior to redemption.

SUMMARY

A ticket issuer server for providing a digital instant lottery ticket on a digital ledger is provided. The ticket issuer server includes a processor circuit and a memory coupled to the processor circuit, wherein the memory comprises computer program instructions that, when executed by the processor circuit, cause the ticket issuer server to perform operations including obtaining an encryption key from a key issuer, encrypting a prize code with the encryption key to provide an encrypted prize code, creating a smart contract representing the digital instant lottery ticket, and storing the smart contract on the digital ledger.

The digital ledger may include a blockchain infrastructure that supports execution of smart contracts, the digital instant lottery ticket may include a smart contract instant lottery ticket (SILT), and the object may include a smart contract, and wherein storing the object in the digital ledger comprises publishing the smart contract to the blockchain infrastructure. The object may include a ticket owner address attribute, a ticket issuer address attribute, a key issuer address attribute and the encrypted prize code.

A key issuer server includes a processor circuit and a memory coupled to the processor circuit, wherein the memory comprises computer program instructions that, when executed by the processor circuit, cause the key issuer server to perform operations including receiving a request for an encryption key from a ticket issuer, generating a public key (PubKeyKI) and a private key (PrivKeyKI) associated with the public key PubKeyKI, transmitting public key PubKeyKI to the ticket issuer, receiving a request to confirm scratching of a digital instant lottery ticket associated with the public key PubKeyKI, receiving an encrypted prize code that was encrypted using the public key PubKeyKI, decrypting the encrypted prize code using the private key PrivKeyKI to obtain a decrypted prize code, and storing the decrypted prize code in a smart contract associated with the digital instant lottery ticket on a computing system including a digital ledger.

A computing device includes a processor circuit and a memory coupled to the processor circuit, wherein the memory comprises computer program instructions that, when executed by the processor circuit, cause the computing device to perform operations including receiving an encrypted public key of a key issuer (PubKeyKI) and a hash of the public key PubKeyKI from an object stored on a computing system including a digital ledger and associated with a digital instant lottery ticket, decrypting the encrypted public key PubKeyKI using a private key (PrivKeyC) to obtain a decrypted public key of the key issuer (D-PubKeyKI), generating a hash of the decrypted public key D-PubKeyKI, comparing the hash of the decrypted public key D-PubKeyKI to the hash of the public key PubKeyKI stored in the object, and confirming that the digital instant lottery ticket is being transferred to the purchaser of the digital instant lottery ticket in response to determining that the hash of the decrypted public key D-PubKeyKI and the hash of the public key PubKeyKI are identical.

A method by a ticket issuer of providing a digital instant lottery ticket on a digital ledger is provided. The method includes performing, via a processor circuit, operations of obtaining an encryption key from a key issuer, encrypting a prize code with the encryption key to provide an encrypted prize code, creating an object representing the digital instant lottery ticket, wherein the object includes a ticket owner address attribute, a ticket issuer address attribute, a key issuer address attribute and the encrypted prize code, and storing the object on the digital ledger. The ticket issuer may redeem the digital instant lottery ticket and transfer a prize indicated by the prize code to the owner of the digital instant lottery ticket.

A method by a key issuer includes performing, via a processor circuit, operations of receiving a request for an encryption key from a ticket issuer, generating a public key (PubKeyKI) and a private key (PrivKeyKI) associated with the public key PubKeyKI, transmitting public key PubKeyKI to the ticket issuer, receiving a request to confirm scratching of a digital instant lottery ticket associated the public key PubKeyKI, receiving an encrypted prize code that was encrypted using the public key PubKeyKI, decrypting the encrypted prize code using the private key PrivKeyKI to obtain a decrypted prize code, and storing the decrypted prize code in an object associated with the digital instant lottery ticket on a computing system including a digital ledger.

A method of using a digital instant lottery ticket by a purchaser of the digital instant lottery ticket, includes performing, via a processor circuit, operations of transmitting a public key (PubKeyC) to an owner of the digital instant lottery ticket, retrieving an encrypted public key (PubKeyKI) of a key issuer and a hash of the public key PubKeyKI from an object stored on a digital ledger and associated with the digital instant lottery ticket, decrypting the encrypted public key PubKeyKI using a private key (PrivKeyC) associated with the public key PubKeyC to obtain a decrypted public key (D-PubKeyKI), generating a hash of the decrypted public key D-PubKeyKI, comparing the hash of the decrypted public key D-PubKeyKI to the hash of the public key PubKeyKI, and confirming that the digital instant lottery ticket is being transferred to the purchaser of the digital instant lottery ticket in response to determining that the hash of the decrypted public key D-PubKeyKI and the hash of the public key PubKeyKI are identical. The user may request redemption of the SILT by the ticket issuer.

BRIEF DESCRIPTION OF THE DRAWINGS

FIGS. 3 to 8 illustrate sample code for implementing a SILT according to some embodiments.

DETAILED DESCRIPTION

Figure 1A:
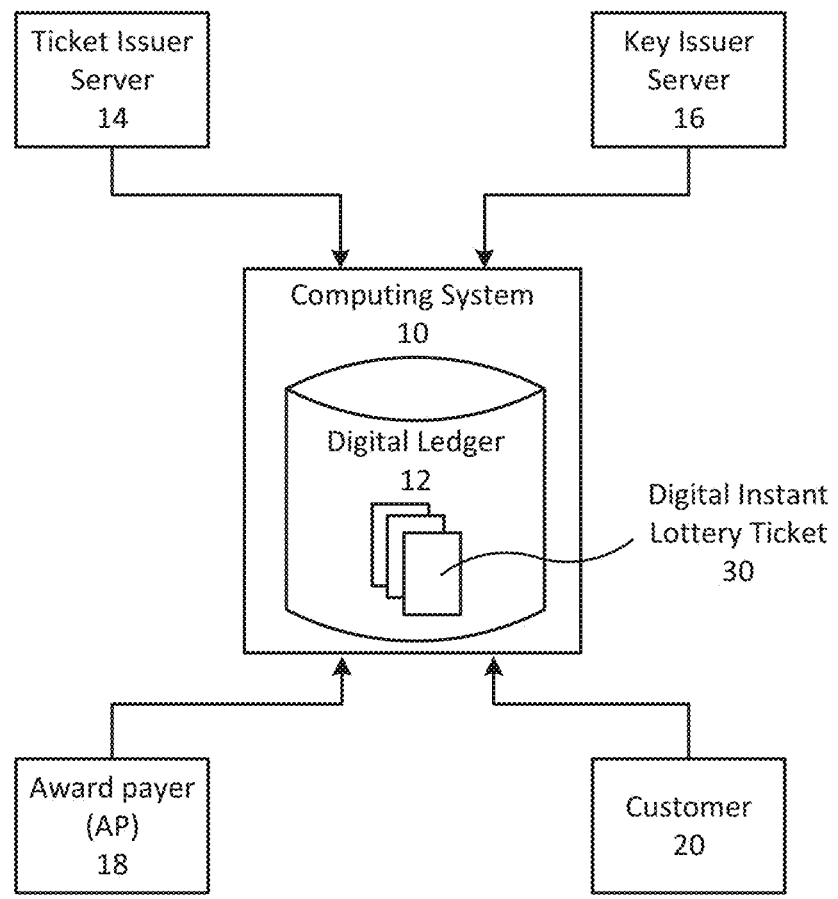
FIG. 1A schematically illustrates some aspects of a digital lottery system for providing digital instant lottery tickets according to some embodiments.

Conventional lottery systems issue physical items, in the form of paper tickets or slips to players to represent a player's entry or entries in the lottery. Depending on the rules of the lottery game in question, physical paper tickets may act as bearer instruments that can be transferred by the player or redeemed if they represent a winning entry. Although lottery tickets provide a convenient record of a lottery entry, conventional paper lottery tickets have a number of drawbacks. For example, in order to redeem a winning ticket, it is typically required for the owner of the ticket to physically present the ticket to the lottery operator or their agent. A physical lottery ticket may be lost, misplaced or stolen, with the result that the owner of the lottery ticket may be unable to redeem a winning lottery ticket. Moreover, because lottery tickets are typically made from paper, they may be easily damaged to the point of being rendered useless by liquids or by being ripped, torn or otherwise physically damaged.

The present inventive concepts provide systems and methods for generating, distributing and transferring digital instant lottery tickets as an alternative to physical instant lottery tickets. In particular, some embodiments provide a Smart contract Instant Lottery Ticket (SILT) that provides a new approach to produce virtual instant lottery tickets. A SILT may exploit smart contract, blockchain and cryptographic features to reduce the cost of printing and distribution of physical instant lottery tickets while providing similar or better security characteristics.

The digitalization era is enabling new opportunities to enhance customer experience, providing new advanced, personalized, tailored and improved services for all actors involved in the gaming value chain. Some embodiments provide systems/methods for generating, distributing, and redeeming digital instant lottery tickets. The digital instant lottery tickets may be generated, stored and manipulated entirely on private computers and/or computing networks.

Some further embodiments provide a smart contract design that enables Instant Lottery Tickets to be provided by decentralized applications (DApps), which are applications that can be published to and executed by a blockchain infrastructure in a distributed manner. Although the description below is focused primarily on blockchain-based approaches that employ a decentralized digital ledger, or public blockchain, it will be appreciated that the embodiments described herein can be implemented on private blockchain systems and/or on privately owned or managed computing systems (with associated databases) that do not employ a blockchain-like architecture for storing transaction records. In such a case, entities described herein can create, transfer and interact with the digital instant lottery tickets using, for example, application programming interface (API) calls to a computing system as will be apparent to those skilled in the art in view of this disclosure. For example, an action that is described herein as being performed by a member function of a smart contract can be implemented instead as method of an object that can be invoked, for example, via an external API call to the computing system.

The blockchain-based approach described herein exploits smart contracts and cryptographic functions, which may help to ensure that security requirements such as confidentiality, integrity, anonymity, portability, observability and nonrepudiation are met when implementing SILTs. Smart contract design may enable all processes that are necessary in the ticket's lifecycle including, issuance, sale, and transfer and redemption of tickets. A SILT can be generated and transferred to a purchaser. Moreover, a SILT may be "scratched" to reveal whether the ticket is a winning ticket, and if so what prize has been won in a manner analogous to scratching a physical lottery ticket.

According to some embodiments, an instant lottery ticket can be represented by a smart contract that is published to a digital ledger or blockchain infrastructure that supports execution of DApps. An example of such a blockchain infrastructure is the Ethereum blockchain infrastructure. However, it will be appreciated that embodiments of the inventive concepts can be implemented on other blockchain infrastructures that support execution of DApps, such as the Cardano and EOS blockchain infrastructures.

Smart contracts may include agreements about a process or workflow, and may describe terms and obligations to be met by parties. In operation, an event-driven state machine may be used to examine terms of the smart contracts. Parties may record signatures and other non-revocable data on a shared ledger. Transactions may be used by users to call and execute smart contracts. A transaction refers to any communication between users or between a user and a financial entity. For example, a transaction may refer to a purchase or sale of good or services, an offer or a return of goods or services, a payment transaction, a credit transaction, or other like interactions. A transaction may also be referred to as a "transaction request," "trade," or "trading."

In some embodiments, a smart contract is represented by a program instance that is implemented, deployed, and executed within the Ethereum or similar environment. A smart contract may store data and/or may include one or more callable member functions. Smart contracts are deployed, stored, and executed within an Ethereum virtual machine or various blockchain nodes. The data stored in a smart contract can be used to record information, facts, associations, balances, and any other information needed to implement logic that implements the contract. Smart contracts may be similar to object-oriented classes in programming languages such as C++ or Java. A smart contract can call another smart contract like an object-oriented object to create and use objects of another class.

From a high-level perspective, a digital instant lottery ticket according to some embodiments is represented by a smart contract that includes functions that manage the sale, ownership, transfer and redemption of the digital instant lottery ticket.

A prize code that indicates what prize, if any, the ticket represents is stored in the SILT upon its creation. However, according to some embodiments, until it is scratched, the prize code is concealed via encryption. To accomplish this, a SILT according to some embodiments may be built upon two different approaches based on both on-chain (transaction in the blockchain) and off-chain features (transaction outside the blockchain as external oracle features and cryptographic primitives).

Conventional instant lottery tickets are printed by an external printing factory for a ticket issuer that manages the instant lottery. The ticket issuer sells the tickets to purchasers and pays out for the winning tickets when they are redeemed by the purchaser. For the sake of simplicity, in the digital scenario described herein, the factory and the ticket issuer will be the same entity, since no physical tickets may be manufactured.

A system for generation, distribution and redemption of digital lottery tickets is illustrated in FIG. 1A. As shown therein, the system includes a computing system 10 that manages a digital ledger 12 in which one or more digital instant lottery tickets 30 are stored. The digital instant lottery tickets 30 are issued and stored onto the digital ledger by a ticket issuer server 14 operated by a ticket issuer that manages a digital instant lottery. The digital instant lottery tickets 30 are created using encryption keys provided by a key issuer server 16. Ownership of the digital instant lottery tickets 12 may be transferred from a ticket issuer to a customer 20. The customer 20 can digitally "scratch" the digital instant lottery ticket to reveal what prize, if any, the digital instant lottery ticket represents. If a prize is won, an award may be paid by the ticket issuer or by an award payer 18.

It will be appreciated that, although they are illustrated as different entities in FIG. 1A, one or more of the ticket issuer server 14, the key issuer server 16, the computing system 10, the digital ledger 12 and/or the award payer 18 may be omitted and/or may be part of the same or related systems and/or be under common control. For example, in some instances, the ticket issuer server 14 may operate the digital ledger 12.

Digital instant lottery tickets 10 may be represented as objects in the computing system 10 that are stored on the digital ledger 12. As is known in the art, in an object-oriented computing system, and "object" may include both data (or attributes) and functions (or methods) that belong to the object and that can be invoked to manipulate the object's attributes. Accordingly, in some embodiments, a digital instant lottery ticket can be represented by an object that can be accessed via the methods associated with the object to perform functions such as creating digital instant lottery ticket, transferring ownership of the digital instant lottery ticket and scratching/redeeming digital instant lottery ticket.

As discussed in more detail below, in some embodiments, the digital ledger 12 includes a blockchain infrastructure that includes a distributed ledger stored across a plurality of distributed computing systems. As is known in the art, the consistency and integrity of a blockchain across a distributed computing system may be provided, for example, through a system of hashing and encryption that ensures that changes to the blockchain are detectable.

Some embodiments presented herein are described with reference to Ethereum technology and use code snippets in the Solidity language version 0.5.0 to support SILT description. However, it will be appreciated that other languages may be used to program in the Ethereum blockchain infrastructure, and that systems/methods described herein may employ databases other than blockchains, and blockchain infrastructures other than Ethereum.

Figure 1B:
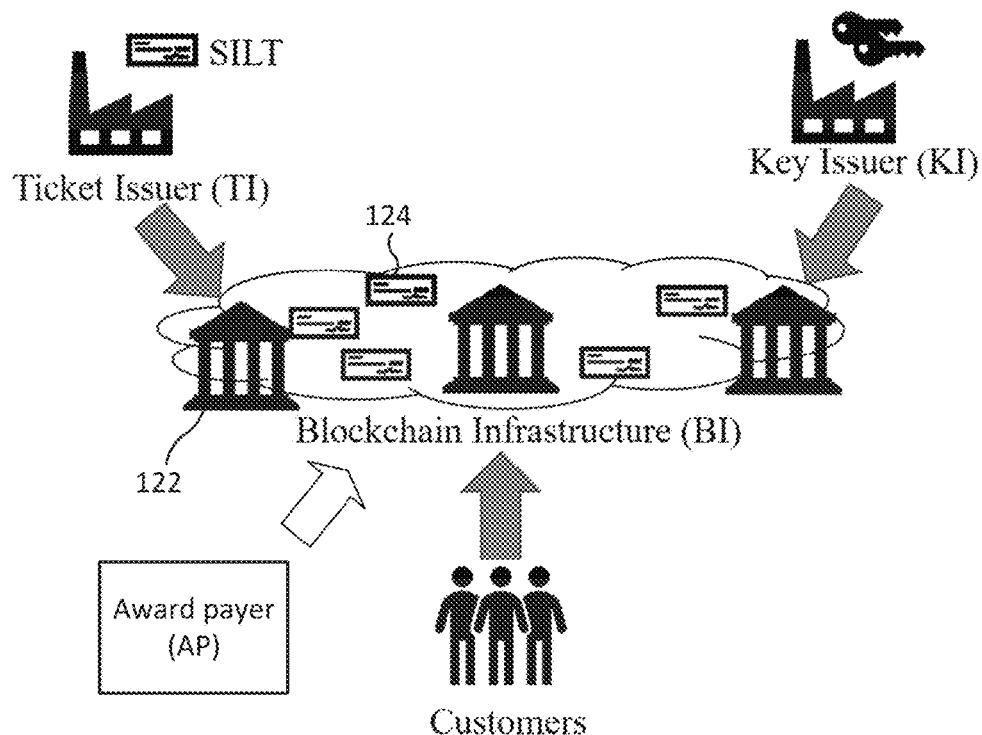
FIG. 1B schematically illustrates some aspects of a digital lottery system for generating smart contract based instant lottery tickets (SILTs) according to some embodiments.

FIG. 1B illustrates various entities involved in the generation, transfer and redemption of a digital instant lottery ticket in the form of a smart contract instant lottery ticket (SILT). As shown therein, a Ticket Issuer (TI), a Key Issuer (KI) and a plurality of customers interact with a blockchain infrastructure (BI) on which the SILT is created.

The Ticket Issuer may generate and publish to the BI a set of SILTs using an algorithm that distributes winning prizes among the tickets using a predefined rule (e.g. 10% tickets of winning category A, 30% tickets of winning category B, 50% tickets of winning category C, 20% tickets of losing category). Other distributions are of course possible, and the definition of winning categories is decided by the Ticket Issuer. The SILT includes a prize code (also referred to as winning content) that defines a prize that can be claimed by the owner of the SILT once it has been "scratched." In some embodiments, a SILT may include multiple prize codes. For example, a single SILT can represent multiple plays of an instant lottery game or entries into multiple different instant lottery games, or both.

The prize code(s) is/are stored in the SILT in encrypted form as digital secrets that are associated with the SILT. The prize code can represent anything of value, such as an amount of physical or cryptocurrency to be paid by a ticket issuer or designated award payer to the owner of a scratched ticket.

Once a SILT has been created, it may be sold to a customer who pays to the Ticket Issuer the cost of the SILT. The cost of the SILT is determined by the Ticket Issuer and is stored in the SILT upon its creation. A customer who purchases the SILT becomes the owner of the SILT. A unique address associated with the owner (which represents an identity of the owner) is stored in the SILT.

Using functions defined in the smart contract that represents the SILT, a customer can transfer SILT to another customer, who becomes the new owner of the SILT. Using built-in functions of the SILT, the owner of the SILT can "scratch" the SILT to reveal the prize, if any, indicated by the prize code, and can redeem the prize transferring the SILT back to the Ticket Issuer. Upon redemption, the Ticket Issuer pays the customer the value of the winning category in return for the SILT ownership. At each stage of the life cycle of the SILT, the state of the silt is represented within the smart contract by a state variable, as discussed in more detail below with respect to FIG. 2.

According to some embodiments, a SILT may have the following properties:

Content hiding: given a SILT, the winning prize should remain unknown until the SILT is scratched. After the scratch, the winning prize should be publicly viewable by anyone.

Publicity: given a SILT, the address (identity) of the owner should be public; i.e., everyone should know the owner based on the address of the owner contained in the SILT.

Scratchable and Redeemable by owner only: only the owner can uncover the winning category (by calling the scratch function of the SILT).

Transferable by owner only: only the owner can transfer ownership of the SILT to a new owner.

Payment for transfer: in each transfer of ownership between a source and a destination, the source must be paid the cost of the SILT. In case of a sale, the source receives the cost of the SILT while in case of redemption, the source receives the value of winning prize.

A SILT may be described in terms of a scenario, a lifecycle and a scratch model associated with the SILT. The scenario describes the context and the actors involved in SILT management. The lifecycle describes the SILT life cycle in terms of status and functions, from issuance to redemption. The scratch model describes the SILT model in terms of attributes and functions using both on-chain and off-chain features of smart contract to guarantee the hiding of information until scratch.

Scenario

A SILT scenario involves interactions between the following actors, as depicted in FIG. 1B. Each actor in the scenario is identified by an External Owned Account (EOA) that may be represented by an address on a blockchain infrastructure (BI). The BI includes a plurality of nodes 122, each of which maintains a copy of a distributed ledger of transactions, some of which include smart contracts 124 that represent SILTs. The actors include a Customer (C), which may be an i-th customer of the DIL, a Ticket Issuer (TI), which is the authority that manages the DIL by creating, issuing, selling and paying out the winning SILTs, and a Key Issuer (KI), which is the authority that issues cryptographic keys used to conceal the prize codes on SILTs. During creation of a SILT, the TI may obtain a public cryptographic key from the KI to encrypt the prize code. The Blockchain Infrastructure (BI) is a distributed ledger infrastructure that acts as a digital notary and also provides a virtual machine for executing the smart contract, enabling the execution of SILT code and enforcement of contract rules. An additional actor in the form of an award payer (AP) may also be defined as the entity that will pay a winning prize to the owner.

The purpose of the KI is to provide two different entities managing the scratchable content of the SILT to guarantee that no one entity (owner included) knows the prize code until the SILT is scratched. In this way, the entity (TI or C) that is the owner of the SILT owns a hidden content (because it is encrypted). The SILT owner knows which key to ask the KI for and use to decrypt the prize code. The KI manages the key necessary to decrypt the content, but may not know exactly which one to use until requested by the owner.

Figure 1C:
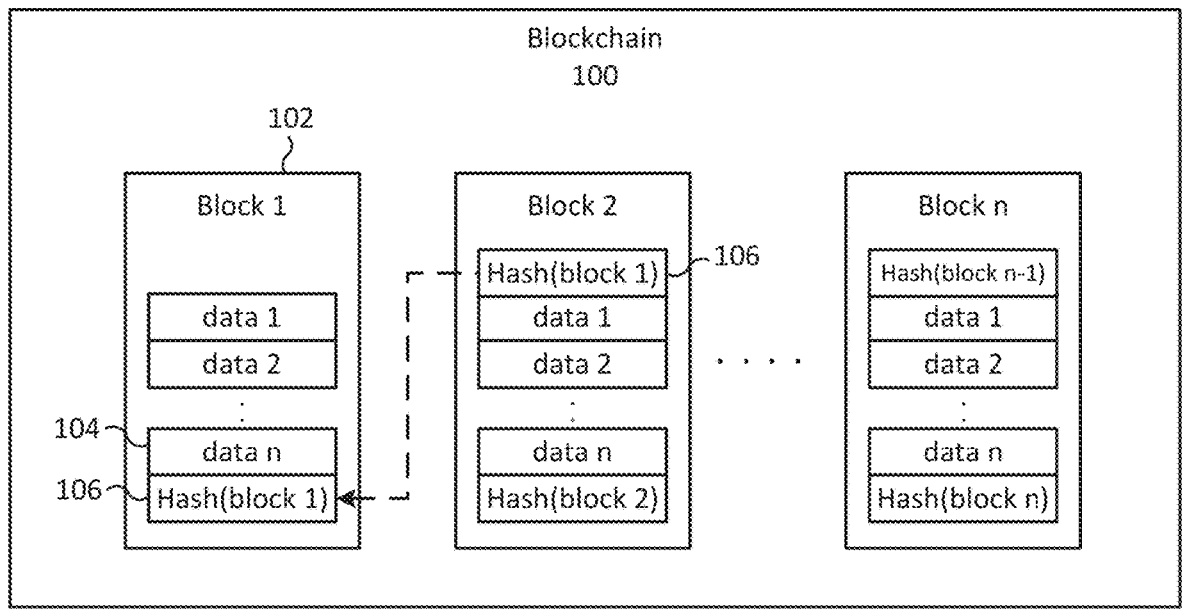
FIG. 1C is a simplified block diagram of a blockchain structure that can be used to implement a SILT according to some embodiments.

Blockchain technology has been used to achieve optimization of a variety of services, such as transaction services in the smart contracts. FIG. 1C illustrates a simplified version of an exemplary blockchain, in accordance with various embodiments. As shown in FIG. 1C, a blockchain 100 may include a plurality of data blocks 102, each of which includes a cryptographic hash 106 (or simply, hash 106) of data stored in the block.

Each block 102 further includes a data structure over which the hash of the block is computed. The data structure may include, for example, transaction data 104 corresponding to the execution results of smart contracts, e.g., balance in an account, payment receipts, etc. As new transactions are submitted to and validated by the network, additional blocks including the new transactions may be generated and appended to the last block of the blockchain 100 by including the hash of the previous block.

Each block is linked to the previous block via the cryptographic hash. For example, block 2 includes in its data structure a hash 106 of block 1 which links it to block 1. In general, block n is linked to block n−1 via another hash of block n−1. Thus, when the hash of block 2 is generated, it is based in part on the hash of block 1.

As is known in the art, blocks 102 may be added to the blockchain 100 in a process known as mining by which a node in a computing network generates an acceptable block according to a proof-of-work or proof-of-stake requirement. Once an acceptable block is found, the node broadcasts it to the network. Each node verifies the new block and, if it is acceptable, adds it to the blockchain and begins working on the next block.

Because each block 102 in the blockchain 100 includes a hash 106 of the previous block 102, any change in a previous block will invalidate all subsequent blocks. This feature enhances the integrity of the blockchain 100, because any party seeking to reverse, erase, or revise a transaction in a block will have to generate new versions of all subsequent blocks. Because of the computational difficulty associated with generating acceptable blocks based on the applicable proof-of-work or proof-of-stake requirement, such a task quickly becomes computationally infeasible as new blocks are added to the chain.

Lifecycle

Figure 2A:
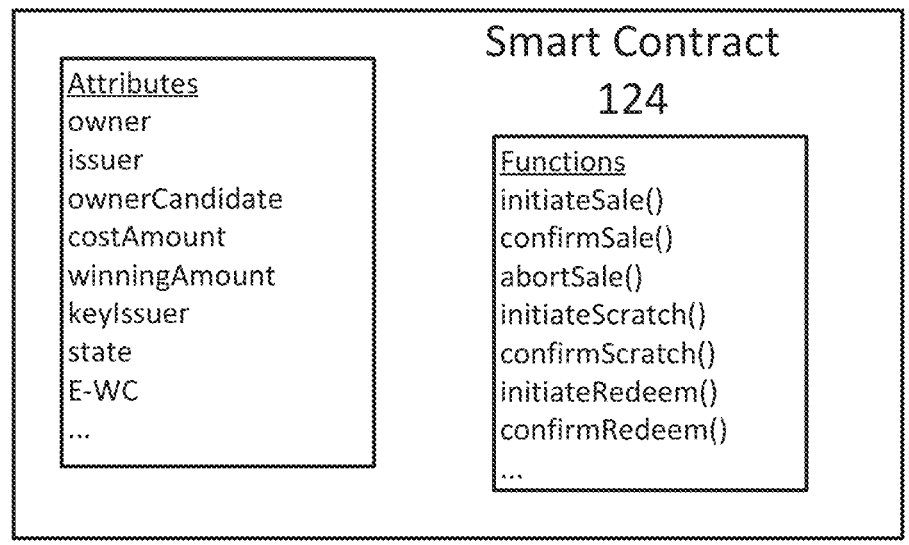
FIG. 2A illustrates various aspects of a smart contract according to some embodiments.

Referring to FIG. 2A, in some embodiments, a SILT may be represented by a single instance 124 of a smart contract. A smart contract may be considered an instance of an object that includes attributes in which data is stored and member functions that may be called to manipulate the object. The attributes may include, for example an Owner, Ticket Issuer, Owner Candidate, Award Payer, etc. The functions may include functions for initiating and confirming a sale of the SILT, initiating and completing a scratch of the SILT, redeeming the SILT, etc.

After creation, a SILT includes references to an Owner, the Ticket Issuer (TI) and to the Key Issuer (KI), shown in FIG. 2A as the attributes owner, issuer and keyIssuer. This information is stored in a data structure in the smart contract instance that represents the SILT and is publicly viewable on the blockchain 100. Attributes may store data, such as addresses, numbers or strings. The attributes of owner, issuer and keyIssuer contain addresses associated with individual actors. The addresses may be provided in the form of cryptographic keys or hashes of cryptographic keys. Thus, for example, a ticket owner (i.e., the entity represented by the owner attribute) can be identified by a cryptographic key or a hash of a cryptographic key that can be used to authenticate an action by the actor, such as a function call by an owner.

In addition, each SILT has an associated ticket cost (costAmount) stored as an attribute in the smart contract and an attribute storing an encrypted copy of the prize code (E-WC). The prize code may indicate a winning category associated with the SILT and/or amount to be paid by the Ticket Issuer to the Owner when the SILT is redeemed.

Figure 2B:
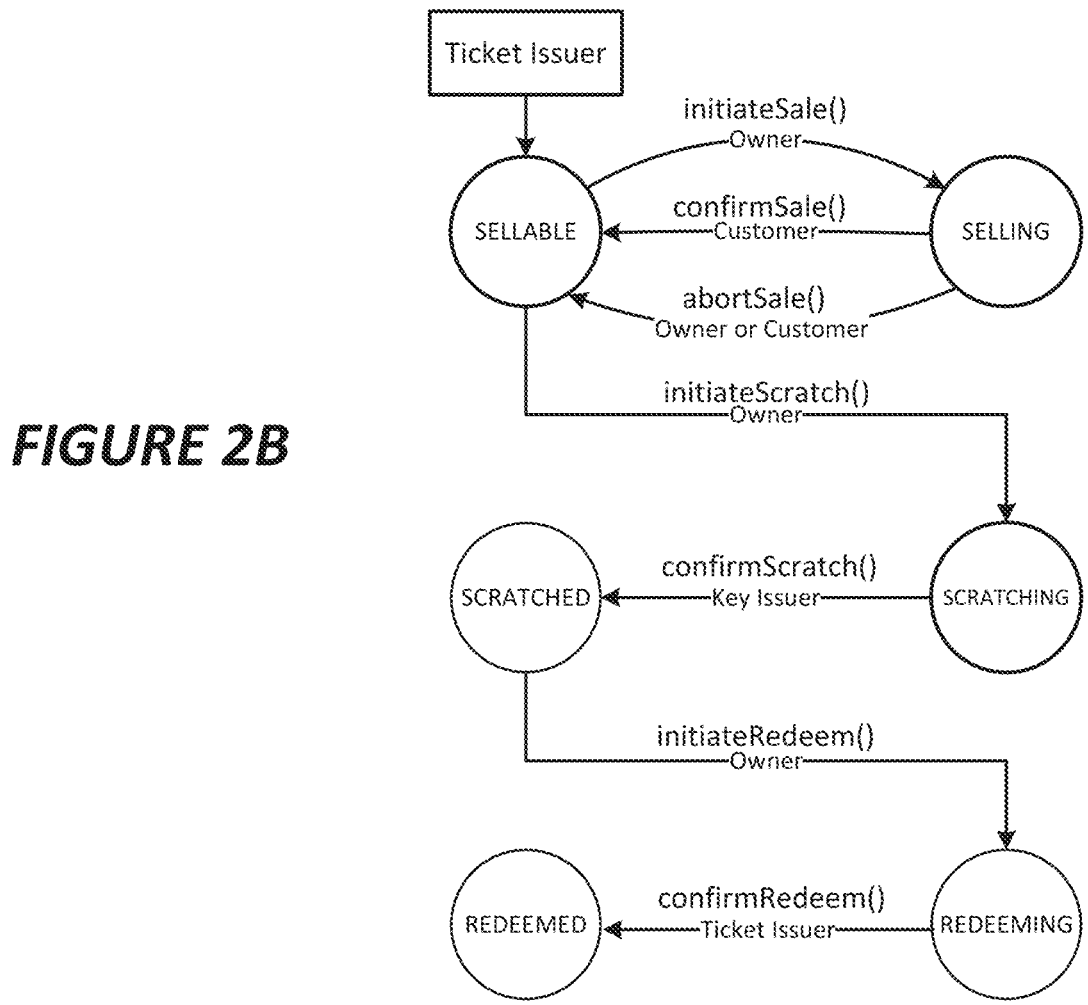
FIG. 2B illustrates states and state transitions of a SILT according to some embodiments.

As noted above, at each point in the lifecycle, the SILT has one of a number of predefined states. The current state of the SILT is stored in a state variable in the smart contract instance associated with the SILT. Acceptable states and state transitions are illustrated in FIG. 2B. According to some embodiments, the SILT can have a state of "SELL- ABLE", "SELLING", "SCRATCHING", "SCRATCHED", "REDEEMING" or "REDEEMED." FIG. 2B also illustrates member functions of the smart contract that implements the SILT that cause state transitions, as well as the party or parties who are allowed to call the functions. Thus, for example, the Owner of a SILT (as represented by the address contained in the owner attribute of the SILT) can call the initiateSale( ) function which causes the state of the SILT to transition from SELLABLE to SELLING.

When the SILT is first created by a Ticket Issuer, the initial owner is the Ticket Issuer, and the state of the SILT is set to SELLABLE. That is, when the SILT is first created, the owner attribute stored in the SILT refers to the Ticket Issuer. When a sale is initiated by the Owner through a call to an initiateSale( ) function, the state is changed to SELLING. The sale can be confirmed by the purchaser, after which the state returns to the SELLABLE state with the purchaser as the new owner. Alternatively, the pending sale can be aborted by either the current owner or the purchaser (i.e., the entity represented by the ownerCandidate attribute), in which case the ownership does not change.

The state can transition from SELLABLE to SCRATCHING in response to a call to the initiateScratch( ) function which can only be called by the owner. Once the Key Issuer has decrypted the prize code via a call to a confirm Scratch( ) function (which can only be called by the Key Issuer), the state of the SILT is changed to SCRATCHED. In the SCRATCHED state, the prize code is visible in clear text on the blockchain. Once the ticket is in the SCRATCHED state, it can be redeemed by the owner via a call to an initiateRedeem( ) function that changes the state of the SILT to REDEEMING. After execution of the initiateRedeem( ) function, the Ticket Issuer can call the confirm Redeem( ) function to confirm redemption. Upon execution of the confirm Redeem( ) function by the Ticket Issuer, the appropriate prize is transferred to the Owner from the Ticket Issuer or the designated Award Payer, if any, ownership of the SILT is transferred to the Ticket Issuer, and the state of the SILT is changed to REDEEMED.

In some embodiments, the winning prize may be transferred to the owner directly via a payment in a native cryptocurrency of the blockchain infrastructure. In the case of the Ethereum infrastructure, the payment could be made automatically via a transfer of Ether from the Ticket Issuer or designated Award Payer to an address of the customer. In other embodiments, payment may be made by transmitting a payment code to the owner or storing on the blockchain a payment code that is encrypted with a public key of the owner (so that it can only be encrypted by the owner), where the payment code can be used by the owner to obtain the prize from the Ticket Issuer or a designated Award Payer. In that case, the prize could be a monetary award or a non-monetary award (e.g., a gift or item).

The SILT lifecycle description is illustrated below with small code snippet functions written in Solidity language 0.5.0 and shown in FIGS. 3 to 8.

Referring to FIGS. 2B and 3, when the TI publishes the SILT to the blockchain, the constructor is executed (step 0—issue), resulting in the creation of an instance of the smart contract that represents a particular SILT. The SILT status becomes SELLABLE and both Owner and Ticket Issuer are set to the same address. At this point a customer can buy the SILT.

The owner (which is initially the TI), starts the sale by passing the address of the customer in a call to the initiateSale( ) function. This function, which can be executed only by the owner, changes the SILT's state to SELLING and sets the owner candidate to the customer address as illustrated in FIG. 4.

In the SELLING state, only the candidate owner (i.e., the entity represented by the ownerCandidate attribute) can accept the sale, which is done by calling the function confirmSale( ) shown in FIG. 5. In some embodiments, this function can be payable, and its execution transfers ownership of the SILT to the owner candidate. The value specified by costAmount is transferred to the previous owner. In other embodiments, the owner candidate may pay the value specified by costAmount directly to the Ticket Issuer in an off-chain transaction.

Conversely, the owner or the ownerCandidate can abort the sale by calling the function abortSale( ) shown in FIG. 6. In each case, the SILT state becomes SELLABLE again as illustrated in FIG. 5 and FIG. 6. This process can be repeated by the purchaser to sell the ticket to a new owner.

In the SELLABLE state, the Owner can "scratch" the SILT by calling the initiateScratch( ) function shown in FIG. 7.

The initiateScratch( ) function changes the state to SCRATCHING and sets an attribute (keyPub) that enables KI to complete the scratch process. The KI reads the keyPub attribute and locates the corresponding private key (kyPriv) that only the KI knows. Using keyPriv, the KI performs off-chain decryption of the prize code.

The KI may be notified that a SILT is in the SCRATCHING state by triggering an event to inform KI to call the confirmScratch( ) function.

After decrypting the prize code, the KI calls the confirmScratch( ) function, which stores the decrypted prize code in the SILT and changes the SILT state to SCRATCHED. As an alternative, the KI could be considered an external oracle that could be invoked directly in the initiateScratch( ) function. As is known in the art, an oracle is a trusted source of information that can be queried from within a function.

Once in the SCRATCHED state, the SILT can be redeemed by the owner through a call to the initiate Redeem( ) function. The initiateRedeem( ) function starts the redemption process and changes the state of the SILT to REDEEMING. The initiateRedeem( ) function can be called only by the SILT Owner as illustrated in FIG. 8. Once in the REDEEMING state, only the Ticket Issuer can call the confirm Redeem( ) function that transfers the value indicated by the prize code from the Ticket Issuer or the designated Award Payer to the Owner, transfers ownership of the SILT from the owner to the Ticket Issuer, and changes the state to REDEEMED.

In some embodiments, the confirmRedeem( ) function is a payable function that transfers a prize amount directly to the owner.

In other embodiments, the confirmRedeem( ) function may encrypt the prize code using the public key of the owner and store the encrypted prize code in an attribute of the SILT so that the owner can decrypt the prize code and present the decrypted prize code to a retailer or other designated award payer for payment.

In some embodiments, the SILT may include multiple prize codes that can be redeemed separately or together. Accordingly, in some embodiments, a SILT may have a state variable associated with each prize code contained in the SILT. The prize codes may be scratched and/or redeemed separately, such that the state of a particular prize code can be changed independently of other prize codes. In some embodiments, multiple prize codes can only be transferred or scratched together, but can be redeemed independently.

Scratch Model

The objective of the scratch model is to create a self-contained smart contract in which all the necessary data for SILT lifecycle are consistent and visible to everyone but usable only by the right actors for each SILT state.

In the following description, the prize code is defined as a set of data, referred to as Winning Content (WC), that includes all SILT data that is to be maintained secret until the SILT is scratched. The WC may include, for example, information such as the prize category, prize amount and other necessary secrets. Moreover, in every transition function, destination actors may be allowed to verify the correctness of data inside the SILT or received as parameters in the function calls.

The scratch model may be built on asymmetric cryptography primitives and may have the following features:

The TI has a pair of public/private cryptographic keys PubKeyTI, PrivKeyTI.

Each customer C has a pair of public/private cryptographic keys PubKeyC, PrivKeyC.

The KI has a plurality of sets of public/private cryptographic keys, where the i-th pair of keys is PubKeyKI(i), PrivKeyKI(i). The WC is encrypted using the i-th public key PubKeyKI(i) and can only be decrypted using the corresponding i-th private key PrivKeyKI(i).

Each SILT instance has the attribute H-PubKeyKI(i) that contains a hashed version of PubKeyKI(i) and is used as the fingerprint of PubKeyKI(i).

Each SILT instance has the attribute E-PubKeyKI(i) that contains the encrypted version of PubKeyKI(i).

Each SILT instance has the attributes WC and E-WC, containing respectively a plain text and encrypted version of winning content (although the plain text attribute WC is not set until the ticket is scratched).

The function hash(p1) is a generic hash function that returns a hash value of the parameter p1, where the parameter p1 is a generic function parameter that can contain, for example, alphanumeric or byte values.

Given the pair of public/private keys k1, k2, enc(p1, k1) is an asymmetric encryption function that uses k1 as an encryption key and returns encrypted version of p1 (i.e., ep1). Similarly, dec(ep1, k2) is an asymmetric decryption function that uses k2 as a decryption key and returns a decrypted version of p1.

The computational steps of the model will now be described with reference to FIG. 9 and FIG. 10. As shown therein, some operations are performed on-chain (i.e., they are executed by nodes in the blockchain infrastructure as part of the process of generating and verifying new blocks), while others are performed off-chain by entities not involved in the blockchain infrastructure.

Figure 9:
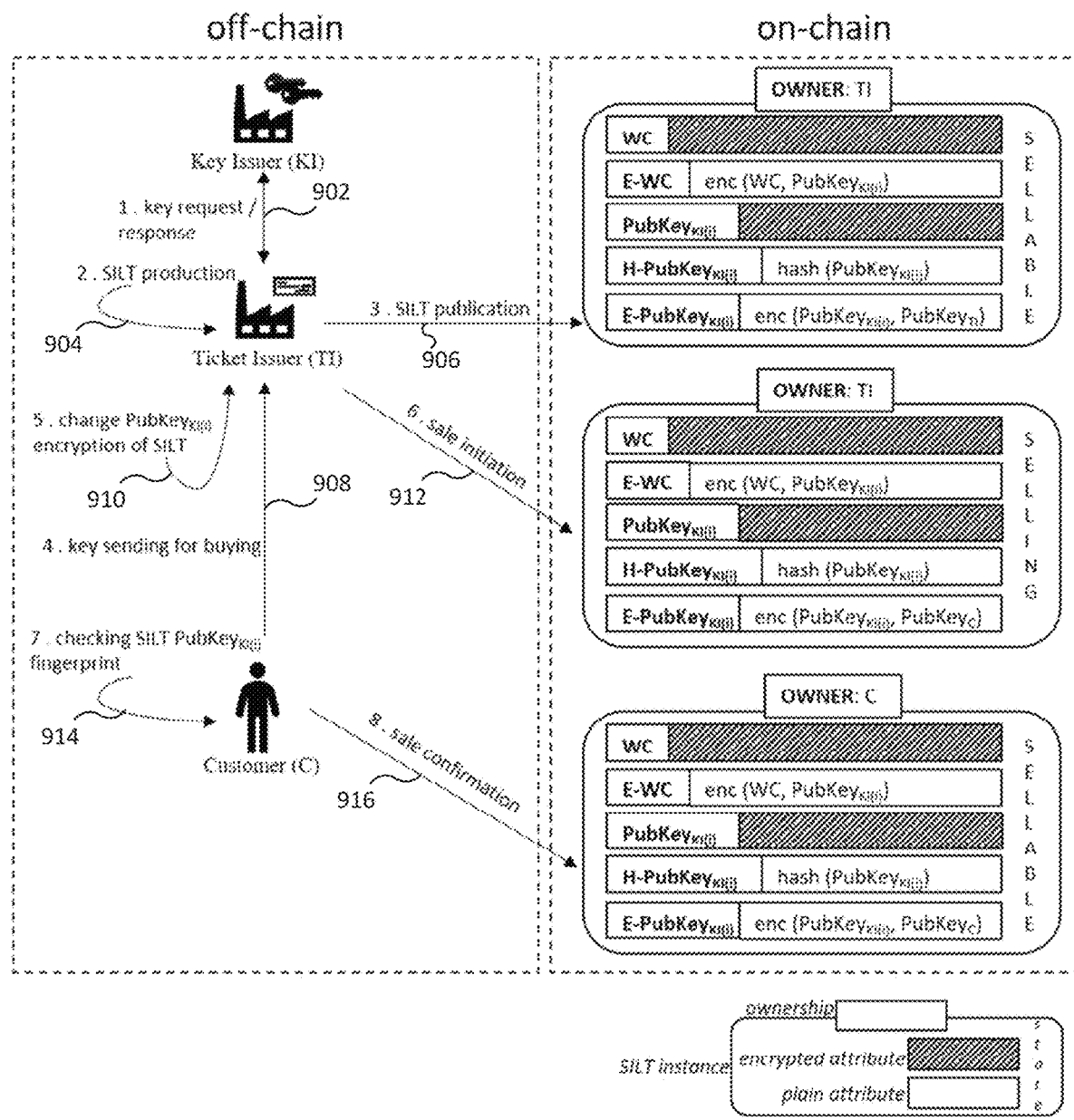
FIG. 9 schematically illustrates operations of generating and transferring a SILT according to some embodiments.

FIG. 9 illustrates SILT instance creation and transfer (including both off- and on-chain operations) according to some embodiments. As shown therein, the operations include:

Off-chain: before publishing a SILT instance to the BI, the TI obtains a key from the KI (902).

The KI generates a key pair and sends the corresponding public key PubKeyKI(i) to the TI.

At step 904, the TI computes the hash of PubKeyKI(i) and encrypts the winning content WC using the PubKeyKI(i). The TI encrypts PubKeyKI(i) using PrivKeyTI and stores this data in the corresponding SILT attributes:

H-PubKeyKI(i)=hash (PubKeyKI(i))
E-WC=enc (WC, PubKeyKI(i))
E-PubKeyKI(i)=enc (PubKeyKI(i), PubKeyTI)

On-chain: The TI publishes SILT to the BI with state SELLABLE (906).

Off-chain: when a Customer wants to buy a SILT, he or she sends their own public key (PubKeyC) to the current owner of the SILT (initially the TI) (908).

Upon receipt of the public key of the Customer, the TI decrypts EPubKeyKI(i), then re-encrypts PubKeyKI(i) with PubKeyC received form the customer (910).

PubKeyKI(i)=dec (E-PubKeyKI(i), PrivKeyTI))
E-PubKeyKI(i)=enc (PubKeyKI(i), PubKeyC)

On-chain: The TI saves the above data in the SILT and calls the initiateSale( ) function to start the transfer to the Customer (912).

At this point, the SILT state is changed to SELLING.

Off-chain: The Customer can check whether the encrypted data saved in the SILT by the TI is consistent/correct by decrypting E-PubKeyKI(i) with PubKeyC and checking the results against HPubKeyKI(i) (914).

At the same time, PubKeyKI(i) remains hidden to the other actors, and in particular to KI.

hash (dec (E-PubKeyKI(i), PrivKeyC))=H-PubKeyKI(i)

On-chain: C accepts the sale by calling the confirmSale( ) function (916). The state of the SILT is changed back to SELLABLE at this point. As illustrated in FIG. 9, at this point, the Customer (who is the new owner) can transfer ownership of SILT to another customer using the same mechanism described above.

Figure 10:
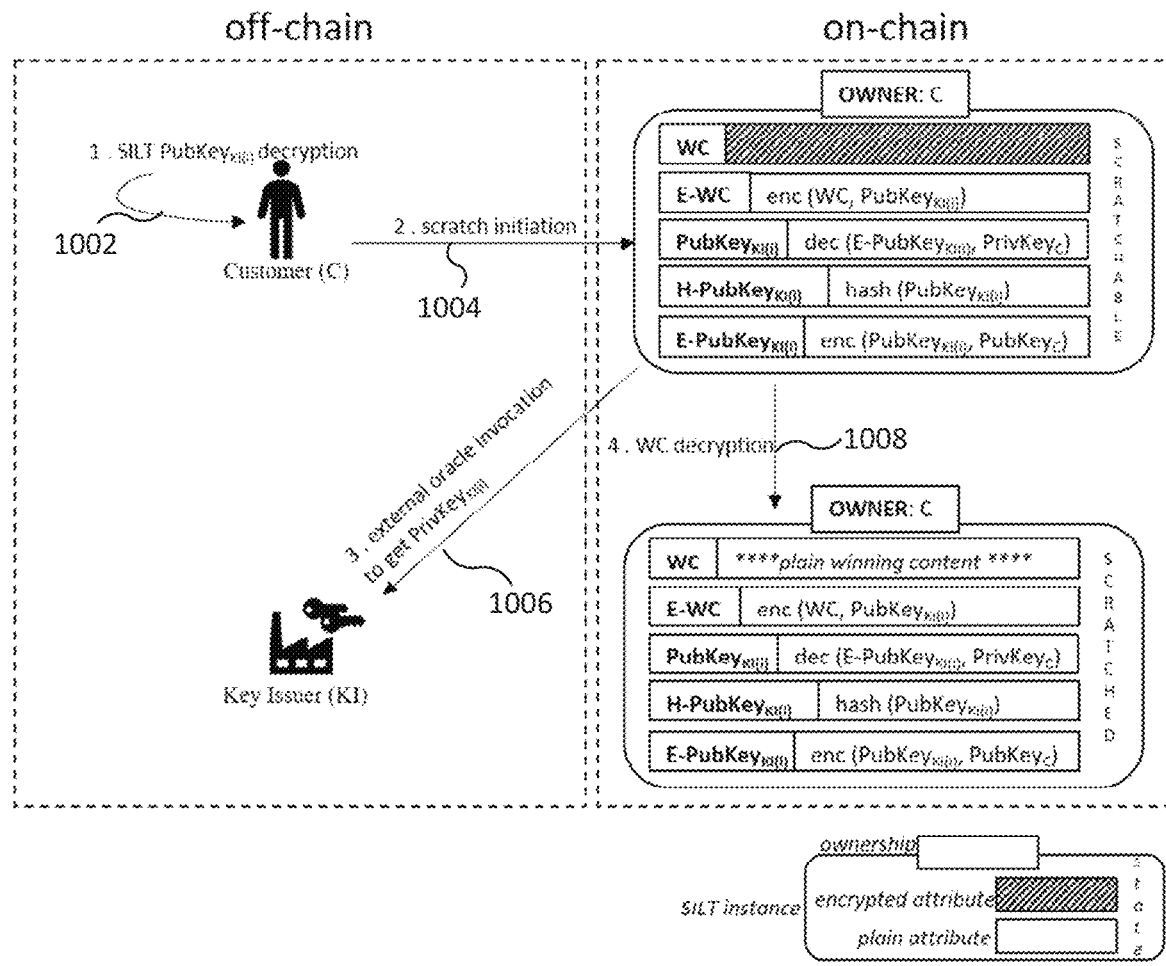
FIG. 10 schematically illustrates operations of "scratching" a SILT to reveal a winning prize according to some embodiments.

Scratching of a SILT is illustrated in FIG. 10. Referring to FIG. 10, scratching involves the following operations:

Off-chain: C starts the scratch by decrypting E-PubKeyKI (i) (1002).

PubKeyKI(i)=dec (E-PubKeyKI(i), PrivKeyC)

On-chain: C calls the initiateScratch( ) function, which publishes PubKeyKI(i) in the SILT (1004). At this point the public key used to encrypt the winning content is visible to everyone. However, the WC cannot be decrypted using the public key. The state of the SILT is changed to SCRATCHING.

Off-chain: The KI uses PubKeyKI(i) to locate the corresponding PrivKeyKI(i), which is maintained secret by the KI (1006). The KI then decrypts E-WC using PrivKeyKI(i) and publishes the plain text WC in the SILT via a call to the confirmScratch( ) function (1008). The state of the SILT is then changed to SCRATCHED.

Assuming that KI acts as an external oracle, the initiateScratch( ) function can be also implemented by invoking an external function provided by KI which, given a PubKeyKI (i) as an input, returns the corresponding PrivKeyKI(i). In this way the initiateScratch( ) function can directly execute decryption with no call to the confirmScratch function:

WC=dec (E-WC, PrivKeyKI(i))

The SILT can then be redeemed when the owner calls the intiateRedeem( ) function as described above. Redemption is completed when the Ticket Issuer calls the confirmRedeem( ) function as described above.

SILT design and DApp implementation offers a significant potential in the gaming industry, because digitalization of an instant lottery can reduce business costs, create new digital experience for customers and/or promote new models of business. In this context, a SILT as described herein includes features such as anonymity, integrity, and non-repudiation, and maintains winning content hidden until the SILT is scratched. This approach may provide an experience that is familiar to users of conventional instant lottery games.

As described herein, a SILT maybe implemented on a public blockchain infrastructure, such as the Ethereum blockchain infrastructure. In some embodiments, financial transactions (e.g., paying for the ticket and redeeming prizes) may take advantage of the availability of a public cryptocurrency, such as Ether (ETH), for making payments on such an infrastructure.

In some alternative implementations, the SILT can be executed in a private instance of the Ethereum blockchain infrastructure managed by the Issuer.

Some embodiments can enable instant ticket digitalization maintaining, at the same time, physical money transactions. For example, in the point of sale, ticket receipt can be digital while money transfer between parties can remain physical.

Figure 11:
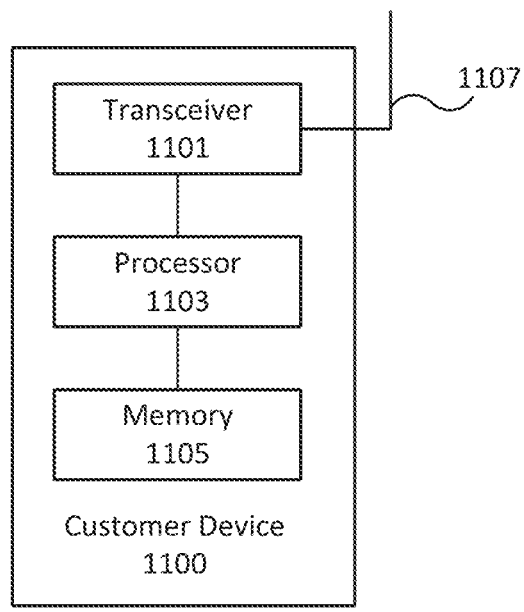
FIG. 11 is a block diagram illustrating some elements of a user device that may interoperate with a digital lottery ticket system in accordance with some embodiments.

FIG. 11 is a block diagram illustrating elements of a customer device 1100 (also referred to as a wireless terminal, a mobile equipment (ME), a wireless communication device, a wireless communication terminal, user equipment, a user equipment node/terminal/device, etc.) configured to operate according to embodiments disclosed herein. As shown, the customer device 1100 may include at least one antenna 1107 (also referred to as antenna), and at least one transceiver circuit 1101 (also referred to as transceiver) including a transmitter and a receiver configured to provide uplink and downlink radio communications with a base station or other radio transceiver element of a radio access network. The customer device 1100 may also include at least one processor circuit 1103 (also referred to as processor) coupled to the transceiver 1101, and at least one memory circuit 1105 (also referred to as memory) coupled to the processor 1103. The memory 1105 may include computer readable program code that when executed by the processor 1103 causes the processor 1103 to perform operations according to embodiments disclosed herein for a customer device 1100. According to other embodiments, processor 1103 may be defined to include memory so that a separate memory circuit is not required. The device 1100 may also include an interface (such as a user interface) coupled with processor 1103.

As discussed herein, operations of the customer device 1100 may be performed by processor 1103 and/or transceiver 1101. Alternatively, or additionally, the customer device 1100 may include modules, e.g., software and/or circuitry, that performs respective operations (e.g., operations discussed herein with respect to example embodiments of customer devices 1100).

Operations of a customer device 1100 may include, for example, accessing a blockchain infrastructure to call one or more functions of a SILT that can be called by a ticket owner or purchaser as described herein.

Figure 12:
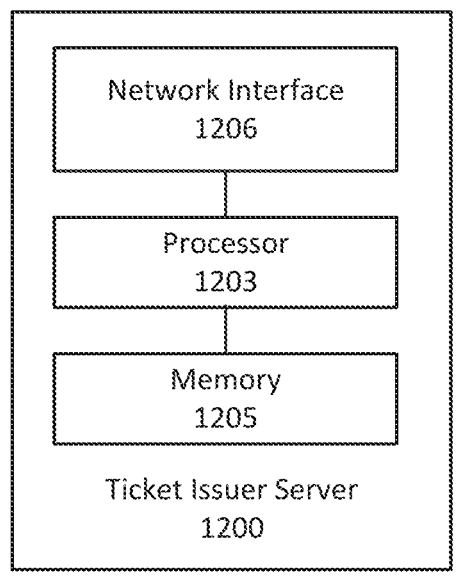
FIG. 12 is a block diagram illustrating some elements of ticket issuer server in a digital lottery ticket system in accordance with some embodiments.

FIG. 12 is a block diagram illustrating elements of a ticket issuer server 1200 according to one or more embodiments disclosed herein. As shown, the issuer server 1200 may include at least one network interface circuit 1207 (also referred to as a network interface) configured to provide communications with other nodes, such as a customer device 1100 and/or a key issuer server 1300. The issuer server 1200 may also include at least one processor circuit 1203 (also referred to as a processor) coupled to the network interface 1207, and at least one memory circuit 1205 (also referred to as memory) coupled to the processor 1203. The memory 1205 may include computer readable program code that when executed by the processor 1203 causes the processor 1203 to perform operations according to embodiments disclosed herein for an issuer server 1200. According to other embodiments, processor 1203 may be defined to include memory so that a separate memory circuit is not required.

As discussed herein, operations of the issuer server 1200 may be performed by processor 1203 and/or network interface 1207. For example, processor 1203 may control network interface 1207 to send communications through network interface 1207 to one or more other network nodes and/or other system nodes, and/or to receive communications through network interface 1207 from one or more other network nodes and/or other system nodes. Alternatively, or additionally, the issuer server 1200 may include modules, e.g., circuitry, that performs respective operations (e.g., operations discussed herein with respect to example embodiments of network nodes).

Operations of a ticket issuer server 1200 may include, for example, creating a SILT and transferring it to a purchaser via calls to one or more functions of a SILT that can be called by a ticket issuer as described herein.

Figure 13:
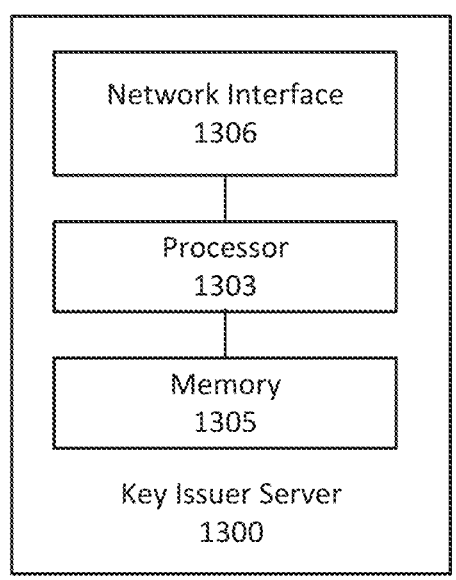
FIG. 13 is a block diagram illustrating some elements of a key issuer server in a digital lottery ticket system in accordance with some embodiments.

FIG. 13 is a block diagram illustrating elements of a key issuer server 1300 according to one or more embodiments disclosed herein. As shown, the key issuer server 1300 may include at least one network interface circuit 1307 (also referred to as a network interface) configured to provide communications with other nodes, such as a customer device 1100 and/or an issuer server 1200. The key issuer server 1300 may also include at least one processor circuit 1303 (also referred to as a processor) coupled to the network interface 1307, and at least one memory circuit 1305 (also referred to as memory) coupled to the processor 1303. The memory 1305 may include computer readable program code that when executed by the processor 1303 causes the processor 1303 to perform operations according to embodiments disclosed herein for a key issuer server 1300. According to other embodiments, processor 1303 may be defined to include memory so that a separate memory circuit is not required.

As discussed herein, operations of the key issuer server 1300 may be performed by processor 1303 and/or network interface 1307. For example, processor 1303 may control network interface 1307 to send communications through network interface 1307 to one or more other network nodes and/or other system nodes, and/or to receive communications through network interface 1307 from one or more other network nodes and/or other system nodes. Alternatively, or additionally, the network node 1300 may include modules, e.g., circuitry, that performs respective operations (e.g., operations discussed herein with respect to example embodiments of network nodes).

Operations of a key issuer server 1300 may include, for example, accessing a blockchain infrastructure to call one or more functions of a SILT that can be called by a key issuer as described herein.

Figure 14:
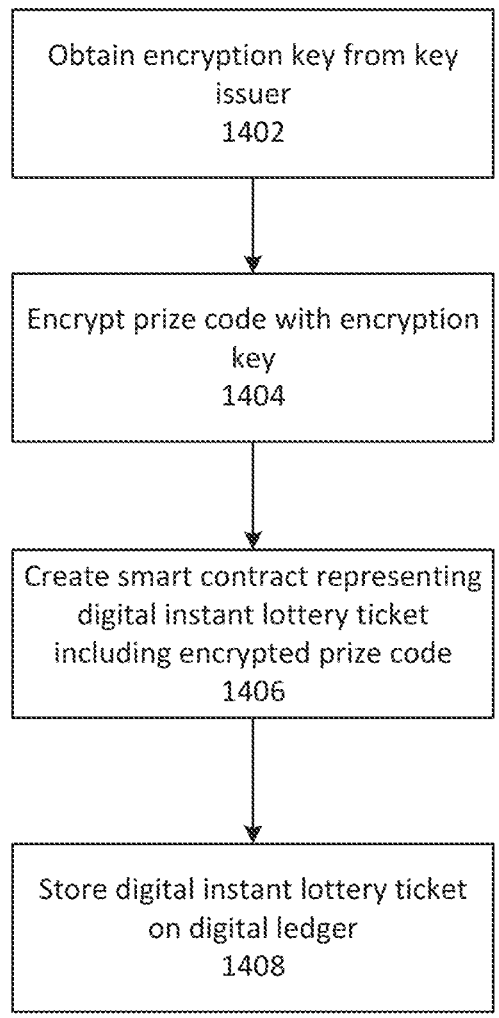
FIG. 14 is a block diagram that illustrates operations of a ticket issuer server according to some embodiments.

FIG. 14 is a flowchart that illustrates operations of a ticket issuer server 1200 for issuing a digital instant lottery ticket, such as a smart contract instant lottery ticket (SILT) according to some embodiments. Referring to FIG. 14, a method of providing a SILT on a digital ledger, which may include a blockchain infrastructure that supports execution of smart contracts, includes performing, via a processor circuit, operations of obtaining (1402) an encryption key from a key issuer, encrypting (1404) a prize code with the encryption key to provide an encrypted prize code, creating (1406) an object, such as a smart contract, representing the digital instant lottery ticket, and storing (1408) the digital instant lottery ticket on the digital ledger. The smart contract may include a ticket owner address attribute, a ticket issuer address attribute, a key issuer address attribute and the encrypted prize code, The method may further include generating a hash of the encryption key, encrypting the encryption key to provide an encrypted encryption key, and storing the hash of the encryption key and the encrypted encryption key in the smart contract.

The encryption key may include a public key, PubKeyKI, of the key issuer that is associated with a private key, PrivKeyKI of the key issuer, and wherein encrypting the encryption key may include encrypting the encryption key using a public key, PubKeyTI, of the ticket issuer that is associated with a private key, PrivKeyTI of the ticket issuer.

The smart contract has a state attribute, and wherein the state attribute of the smart contract is set to a first state indicating that the SILT can be sold upon creation of the smart contract.

The method may further include receiving a public key, PubKeyC, of a customer, decrypting the public key PubKeyKI of the key issuer, encrypting the encryption key using the public key PubKeyC of the customer to provide a new encrypted encryption key, storing the new encrypted encryption key in the smart contract, and setting the state attribute of the smart contract to a second state indicating that the SILT is in the process of being sold.

The smart contract may include a constructor function that sets values of the ticket owner address, ticket issuer address, key issuer address and encrypted prize code attributes.

The constructor function sets values of a state attribute and a ticket cost attribute, and wherein the constructor function sets the value of the state attribute to a first state indicating that the SILT can be sold.

The smart contract may include an initiateSale function that is callable only by the ticket owner address, wherein the initiateSale function sets a value of an owner candidate address that is passed as an argument to the initiateSale function and sets the value of the state attribute to a second state indicating that the SILT is in the process of being sold.

The smart contract may include a confirmSale function that is callable only by the owner candidate address, wherein the confirmSale function transfers value equal to the ticket cost attribute (costAmount) to the ticket owner address, sets the owner attribute to the owner candidate address, and sets the value of the state attribute to the first state indicating that the SILT can be sold.

In some cases, payment for the ticket may be made off-chain. For example, the purchaser may purchase the SILT from a reseller or retailer. In that case, the confirmSale function may not transfer value equal to the ticket cost. Rather, the retailer or reseller would confirm payment.

The smart contract may include an initiateScratch function that is callable only by the ticket owner address using as an argument a public key, PubKeyKI, of the key issuer that is associated with a private key, PrivKeyKI of the key issuer, that was used to encrypt the prize code, and wherein the initiateScratch function sets the state attribute to a third state indicating that the SILT is ready to be scratched.

The smart contract may include a confirmScratch function that is callable only by the key issuer address, wherein the confirmScratch function stores a decrypted prize code in the smart contract and sets the state attribute to a fourth state indicating that the SILT has been scratched.

The smart contract may include an initiateRedeem function that is callable by the ticket owner and that sets the state attribute to a fifth state indicating that the SILT is being redeemed.

The smart contract may include a confirmRedeem function that is callable only by the ticket issuer address, wherein the confirmRedeem function transfers a value specified by the prize code to the owner address and sets the state attribute to a sixth state indicating that the SILT has been redeemed.

The confirmRedeem function may further set the owner address attribute (owner) to the ticket issuer address.

In some embodiments, the value specified by the prize code is transferred to the owner from an address associated with a designated award payer, wherein the address of the designated award payer is stored in the smart contract.

In some embodiments, upon redemption of a winning SILT, payment or awarding of the prize may be made off-chain, such as by a retailer. The prize may be a monetary prize or a non-monetary prize. For example, the prize may be one or more new SILTs.

In some embodiments, the smart contract includes a confirmScratch function that is callable only by the key issuer address, wherein the confirmScratch function stores a copy of the prize code that has been re-encrypted with an encryption key of the owner in the smart contract and sets the state attribute to a fourth state indicating that the SILT has been scratched.

In some embodiments, the smart contract comprises a plurality of prize codes, wherein each prize code can be revealed separately.

Figure 15A:
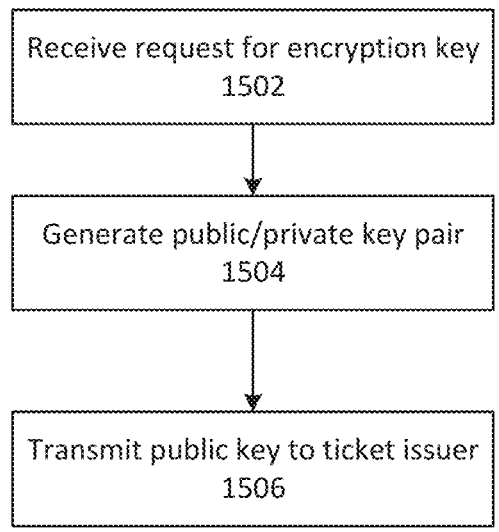
FIGS. 15A and 15B are block diagrams that illustrates operations of a key issuer server according to some embodiments.

FIG. 15A illustrates a method by a key issuer of generating a public/private key pair for use by a ticket issuer in encrypting a prize code according to some embodiments. The method may include performing, via a processor circuit, operations of receiving (1502) a request for an encryption key from a ticket issuer, generating (1504) a public key, PubKeyKI, and a private key, PrivKeyKI associated with the public key PubKeyKI, and transmitting (1506) the public key PubKeyKI to the ticket issuer.

Figure 15B:
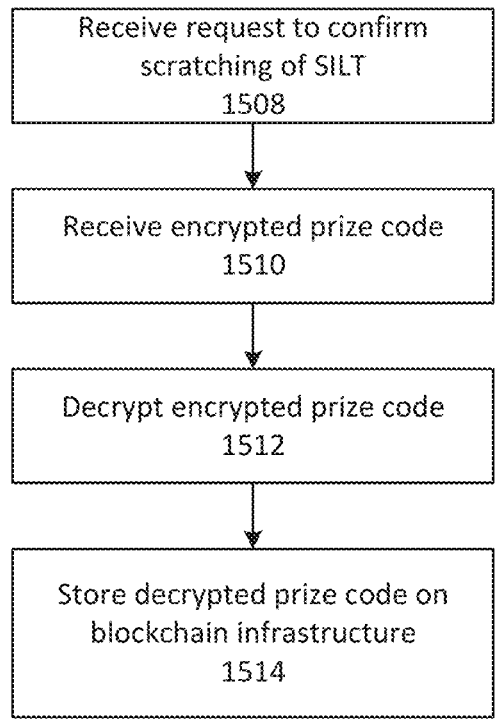

FIG. 15B illustrates operations of a key issuer server according to further embodiments. In particular, FIG. 15B illustrates operations of a key issuer server to complete a scratch of a SILT. As shown therein, the method may include receiving (1508) a request to confirm scratching of a smart contract instant lottery ticket (SILT) associated the public key PubKeyKI, receiving (1510) an encrypted prize code that was encrypted using the public key PubKeyKI, decrypting (1512) the encrypted prize code using the private key, PrivKeyKI to obtain a decrypted prize code, and storing (1514) the decrypted prize code in a smart contract associated with the SILT on a blockchain infrastructure.

Storing the decrypted prize code on the blockchain infrastructure may include calling a confirmScratch function of the smart contract using a key issuer address associated with the key issuer.

The confirmScratch function stores the decrypted prize code in the smart contract and sets a state attribute of the smart contract to a state indicating that the SILT has been scratched.

In some embodiments, the confirmScratch function re-encrypts the prize code using an encryption key of an owner of the SILT and stores the re-encrypted prize code in the smart contract, and sets a state attribute of the smart contract to a state indicating that the SILT has been scratched.

Figure 16A:
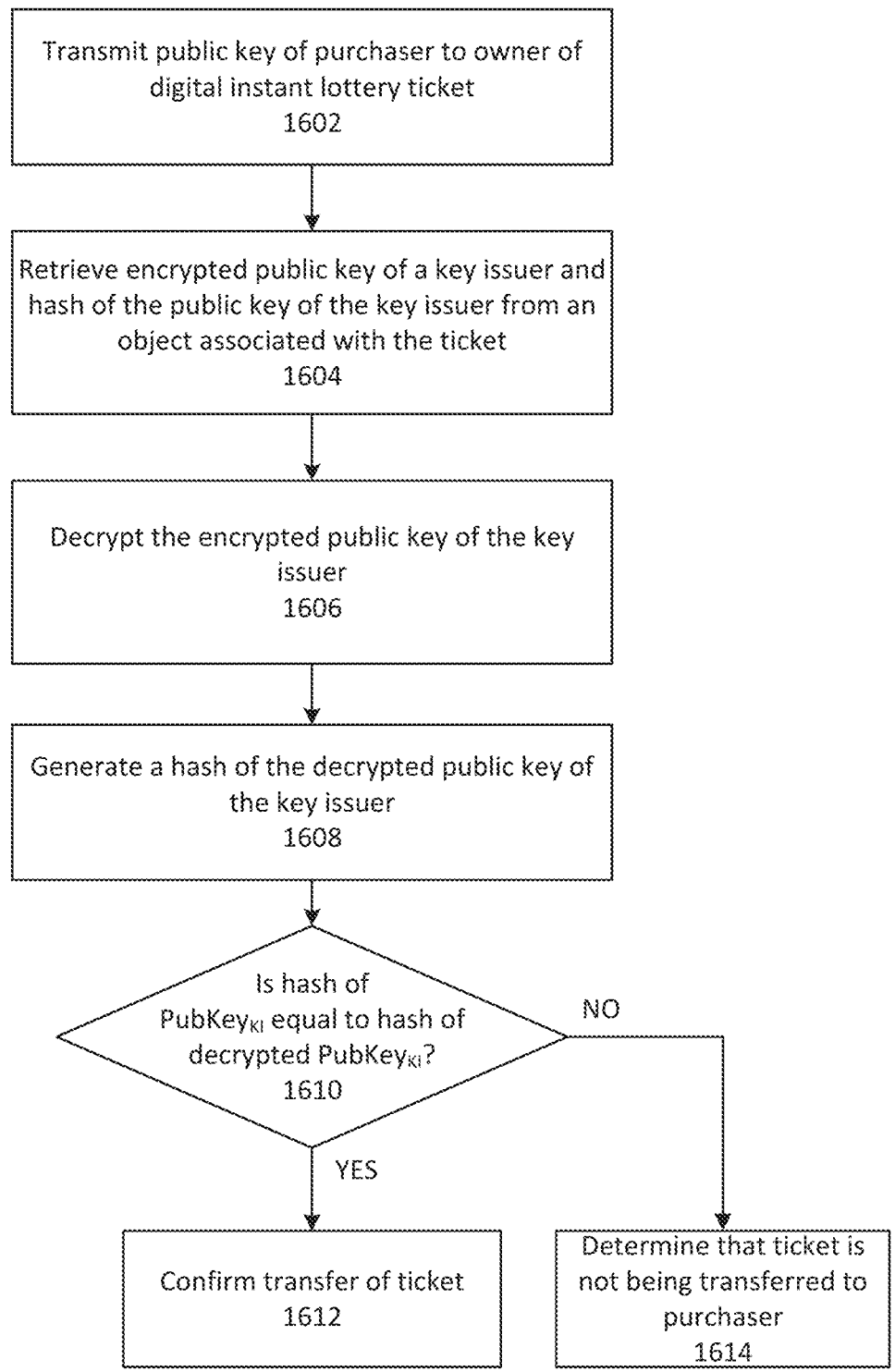
FIGS. 16A and 16B are block diagrams that illustrates operations of a user device according to some embodiments.

FIG. 16A illustrates a method of using a digital instant lottery ticket by a purchaser. In particular, FIG. 16A illustrates operations associated with purchasing a digital instant lottery ticket, such as a smart contract instant lottery ticket (SILT) from an owner, such as the ticket issuer. The method may include including performing, via a processor circuit, operations of transmitting (1602) a public key, PubKeyC, to an owner of the digital instant lottery ticket, retrieving (1604) an encrypted public key, PubKeyKI, of a key issuer and a hash of the public key PubKeyKI from an object, such as a smart contract stored on a digital ledger and associated with the digital instant lottery ticket, decrypting (1606) the encrypted public key PubKeyKI using a private key PrivKeyC associated with the public key PubKeyC to obtain a decrypted public key, D-PubKeyKI, and generating (1608) a hash of the decrypted public key D-PubKeyKI. The method further includes comparing (1610) the hash of the decrypted public key D-PubKeyKI to the hash of the public key PubKeyKI, and confirming (1612) that the digital instant lottery ticket is being transferred to the purchaser in response to determining that the hash of the decrypted public key D-PubKeyKI and the hash of the public key PubKeyKI are identical. If the hash of the decrypted public key D-PubKeyKI is not identical to the hash of the public key PubKeyKI, the method determines (1614) that the digital instant lottery ticket is not being transferred to the purchaser.

The method may further include, before retrieving the encrypted public key PubKeyKI of a key issuer and the hash of the public key PubKeyKI from the SILT, determining that the smart contract has a state attribute set to a value indicating that the SILT is in the process of being sold.

The method may further include calling a confirmSale function of the smart contract, wherein the smart contract may include a ticket cost attribute (costAmount) and a ticket owner address attribute (owner), and wherein the confirmSale function transfers value equal to the ticket cost attribute to the ticket owner address, sets the owner attribute to an address associated with the purchaser, and sets the value of the state attribute to a value indicating that the SILT can be sold.

Figure 16B:
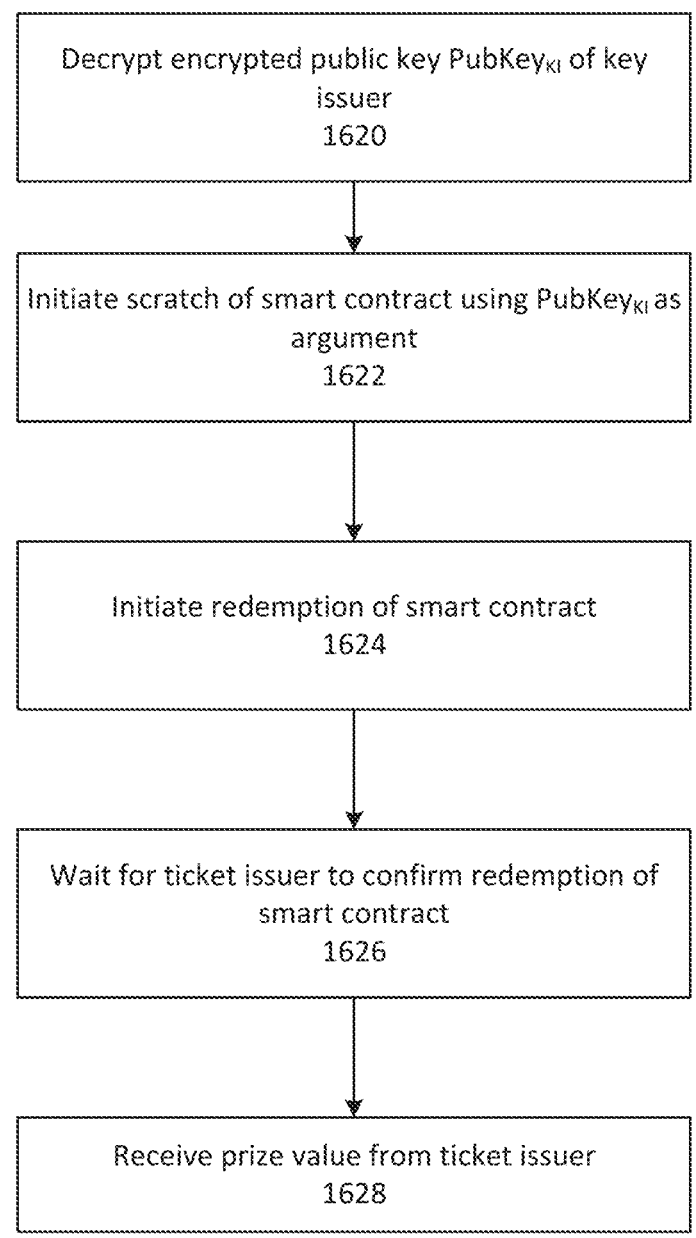

FIG. 16B illustrates operations of a customer device for redeeming a digital instant lottery ticket, such as a SILT. Referring to FIG. 16B, the method may further include decrypting (1620) the encrypted public key PubKeyKI using the private key PrivKeyC to obtain a decrypted public key, D-PubKeyKI, and initiating (1622) a scratch of the SILT, such as by calling an initiateScratch function of the smart contract using the decrypted public key D-PubKeyKI as an argument. The customer device may further redeem the prize by initiating (1624) redemption of the smart contract, such as by calling an initiateRedeem function that sets the state of the SILT to REDEEMING. The customer device then waits (1626) for the ticket issuer to confirm redemption. Once this occurs, the customer device receives (1628) a prize value from a ticket issuer address, wherein the prize value is determined based on a prize code attribute (winningAmount) in the smart contract.

The initiateScratch function sets the state attribute to a value indicating that the SILT is being scratched.

In some embodiments, the value of a prize code may vary depending upon which items were scratched and which were not. For example, a SILT could embody a game like 'Minefield' where the owner scratches as many prize codes as he or she wants, but if they scratch a secret 'mine', they lose everything. In other embodiments, the value of the prize may increase as the owner scratches more winning items without revealing a "mine" (e.g., collect 3 of the same items without scratching a 'mine' and the owner wins a prize) In some embodiments, every SILT may be a potential winner provided the owner has scratched off a prize without revealing a "mine."

In some embodiments, there may be different types of prize codes, and prize codes may be embedded in other prize codes. For example, a SILT may embody a game such as Double or Nothing in which the owner scratches a prize code that says they have won a predetermined amount (e.g., $5). The owner may then be asked if they would like to scratch the next prize code to possibly double the money or lose that amount. Another example is a 'Deal or No Deal' scenario where there is a chain of secrets that must be scratched in order to obtain a final prize. At each level, there could be an option of continuing (with some risk of loss) or settling for a certain amount.

In some embodiments, multiple SILTs, each containing one or more revealed prize codes, may be combined to generate an overall prize. For example, customers on social media could try to collect a complete set of virtual items represented by different prize codes.

In some embodiments, the value of the revealed prize code may not be realized unless/until combined with a real-world item. For example, a SILT include a prize code provided by a casino that will double the prizes awarded on a slot machine during a particular time frame.

In some embodiments, some or all of the operations described herein may be implemented as virtual components executed by one or more virtual machines implemented in one or more virtual environments hosted by one or more of network nodes. Further, in embodiments in which the virtual node is not a radio access node or does not require radio connectivity (e.g., a core network node), then the network node may be entirely virtualized.

The operations may be implemented by one or more applications (which may alternatively be called software instances, virtual appliances, network functions, virtual nodes, virtual network functions, etc.) operative to implement some of the features, functions, and/or benefits of some of the embodiments disclosed herein. Applications are run in a virtualization environment which provides hardware comprising processing circuitry and memory. Memory contains instructions executable by processing circuitry whereby application is operative to provide one or more of the features, benefits, and/or functions disclosed herein.

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

The embodiments described herein provide useful physical machines and particularly configured computer hardware arrangements of computing devices, servers, electronic gaming terminals, processors, memory, networks, for example. Illustrative systems for implementing the described techniques include a general purpose computing device in the form of a computer, such as a mobile computing device in or a fixed computing device. Components of the computer may include, but are not limited to, a processing unit including a processor circuit, such as a programmable microprocessor or microcontroller, a system memory, and a system bus that couples various system components including the system memory to the processing unit.

The processor circuit may be a multi-core processor including two or more independent processing units. Each of the cores in the processor circuit may support multi-threading operations, i.e., may have the capability to execute multiple processes or threads concurrently. Additionally, the processor circuit 53 may have an on-board memory cache. An example of a suitable multi-core, multithreaded processor circuit is an Intel® Core i7-7920HQ processor, which has four cores that support eight threads each and has an 8 MB on-board cache. In general, the processor circuit may, for example, include any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer typically includes a variety of computer readable media. Computer readable media can be any available media that can be accessed by computer and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory includes computer storage media in the form of volatile and/or nonvolatile memory such as read only memory (ROM) and random access memory (RAM). A basic input/output system (BIOS), containing the basic routines that help to transfer information between elements within the computer, such as during start-up, is typically stored in the ROM. The RAM typically contains data and/or program modules that are immediately accessible to and/or presently being operated on by the processing unit. The system memory may store an operating system, application programs, other program modules, and program data.

The computer may also include other removable/non-removable, volatile/nonvolatile computer storage media. By way of example only, the computer may include a hard disk drive reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk such as a CD ROM or other optical media. Other removable/non-removable, volatile/nonvolatile computer storage media that can be used in the illustrative operating environment include, but are not limited to, magnetic tape cassettes, flash memory cards, digital versatile disks, digital video tape, solid state RAM, solid state ROM, and the like. The hard disk drive is typically connected to the system bus through a non-removable memory interface.

The drives and their associated computer storage media discussed above provide storage of computer readable instructions, data structures, program modules and other data for the computer. A user may enter commands and information into the computer through input devices such as a keyboard and pointing device, commonly referred to as a mouse, trackball or touch pad. Other input devices (not shown) may include a microphone, joystick, game pad, satellite dish, scanner, touchscreen, or the like. These and other input devices are often connected to the processing unit through a user input interface that is coupled to the system bus, but may be connected by other interface and bus structures, such as a parallel port, game port or a universal serial bus (USB). A monitor or other type of display device is also connected to the system bus via an interface, such as a video interface. In addition to the monitor, computers may also include other peripheral output devices such as speakers and a printer, which may be connected through an output peripheral interface.

The computer may operate in a networked environment using logical connections to one or more remote computers, such as a remote computer. The remote computer may be a personal computer, a server, a router, a network PC, a peer device or other common network node, and typically includes many or all of the elements described above relative to the computer. The logical connections include a local area network (LAN) connection and a wide area network (WAN) connection, but may also include other networks. Such networking environments are commonplace in offices, enterprise-wide computer networks, intranets and the Internet.

When used in a LAN networking environment, the computer may be connected to the LAN through a network interface or adapter. When used in a WAN networking environment, the computer may include a modem or other means for establishing communications over the WAN. The modem, which may be internal or external, may be connected to the system bus via the user input interface, or other appropriate mechanism.

Some embodiments of the present invention are described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processing circuitry of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the present invention may be written in any conventional procedural programming language, including interpreted languages, assembled languages and/or compiled languages. The program code may execute entirely on the user's computer, partly on the user's computer, as a stand alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the invention and, although specific terms are employed, they are used in a generic and descriptive sense only and not for purposes of limitation, the scope of the inventive concepts being set forth in the following claims.

What is claimed is:

1. A ticket issuer server for providing a digital instant lottery ticket on a digital ledger, the ticket issuer server comprising a processor circuit and a memory coupled to the processor circuit, wherein the memory comprises computer program instructions that, when executed by the processor circuit, cause the ticket issuer server to perform operations comprising:
    obtaining an encryption key from a key issuer;
    encrypting a prize code with the encryption key to provide an encrypted prize code;
    creating an object representing the digital instant lottery ticket; and
    storing the object in the digital ledger,
    wherein the digital ledger comprises a blockchain infrastructure that supports execution of smart contracts, wherein the digital instant lottery ticket comprises a smart contract instant lottery ticket (SILT), and wherein the object comprises a smart contract, and wherein storing the object in the digital ledger comprises publishing the smart contract to the blockchain infrastructure,
    wherein the object includes a ticket owner address attribute, a ticket issuer address attribute, a key issuer address attribute and the encrypted prize code,
    wherein the smart contract comprises a constructor function that sets values of the ticket owner address, ticket issuer address, key issuer address and encrypted prize code attributes, and
    wherein the constructor function sets values of a state attribute and a ticket cost attribute, and wherein the constructor function sets the value of the state attribute to a SELLABLE state indicating that the SILT can be sold.

2. The ticket issuer server of claim 1, wherein the operations further comprise:
    generating a hash of the encryption key;
    encrypting the encryption key to provide an encrypted encryption key; and
    storing the hash of the encryption key and the encrypted encryption key in the smart contract.

3. The ticket issuer server of claim 2, wherein the encryption key comprises a public key of the key issuer (PubKeyKI) that is associated with a private key of the key issuer (PrivKeyKI), and wherein encrypting the encryption key comprises encrypting the encryption key using a public key of the ticket issuer (PubKeyTI) that is associated with a private key of the ticket issuer (PrivKeyTI).

4. The ticket issuer server of claim 1, wherein the smart contract comprises an initiateSale function that is callable only by the ticket owner address, wherein the initiateSale function sets, as an owner candidate address, a value that is passed as an argument to the initiateSale function and sets the value of the state attribute to a SELLING state indicating that the SILT is in the process of being sold.

5. The ticket issuer server of claim 4, wherein the smart contract comprises a confirmSale function that is callable only by the owner candidate address, wherein the confirmSale function transfers value equal to the ticket cost attribute to the ticket owner address, sets the owner attribute to the owner candidate address, and sets the value of the state attribute to the SELLABLE state indicating that the SILT can be sold.

6. The ticket issuer server of claim 5, wherein the smart contract comprises an initiateScratch function that is callable only by the ticket owner address using as an argument a public key of the key issuer (PubKeyKI) that is associated with a private key of the key issuer (PrivKeyKI), that was used to encrypt the prize code, and wherein the initiateScratch function sets the state attribute to a SCRATCHABLE state indicating that the SILT is ready to be scratched.

7. The ticket issuer server of claim 6, wherein the prize code comprises a first prize code, wherein the smart contract comprises a second prize code.

8. The ticket issuer server of claim 6, wherein the smart contract comprises a confirmScratch function that is callable only by the key issuer address, wherein the confirmScratch function stores a decrypted prize code in the smart contract and sets the state attribute to a SCRATCHED state indicating that the SILT has been scratched.

9. The ticket issuer server of claim 8, wherein the smart contract comprises an initiateRedeem function that is callable only by the ticket owner address and that sets the state attribute to a fifth state indicating that the SILT is being redeemed.

10. The ticket issuer server of claim 9, wherein the smart contract comprises a confirmRedeem function that is callable only by the ticket issuer address, wherein the confirmRedeem function transfers a value specified by the prize code to the owner address and sets the state attribute to a sixth state indicating that the SILT has been redeemed.

11. The ticket issuer server of claim 10, wherein the value specified by the prize code is transferred to the owner from an address associated with a designated award payer, wherein the address of the designated award payer is stored in the smart contract.

12. The ticket issuer server of claim 11, wherein the redeem function further sets the owner address attribute to the ticket issuer address.

13. The ticket issuer server of claim 6, wherein the smart contract comprises a confirmScratch function that is callable only by the key issuer address, wherein the confirmScratch function stores a copy of the decrypted prize code in the smart contract and sets the state attribute to a SCRATCHED state indicating that the SILT has been scratched.

14. The ticket issuer server of claim 1, wherein the smart contract comprises a plurality of prize codes, wherein each prize code can be revealed separately.

15. The ticket issuer server of claim 1, wherein the digital ledger comprises a private database that is managed by the ticket issuer server.

16. A ticket issuer server for providing a digital instant lottery ticket on a digital ledger, the ticket issuer server comprising a processor circuit and a memory coupled to the processor circuit, wherein the memory comprises computer program instructions that, when executed by the processor circuit, cause the ticket issuer server to perform operations comprising:
obtaining an encryption key from a key issuer;
encrypting a prize code with the encryption key to provide an encrypted prize code;
creating an object representing the digital instant lottery ticket; and
storing the object in the digital ledger,
wherein the digital ledger comprises a blockchain infrastructure that supports execution of smart contracts, wherein the digital instant lottery ticket comprises a smart contract instant lottery ticket (SILT), and wherein the object comprises a smart contract, and wherein storing the object in the digital ledger comprises publishing the smart contract to the blockchain infrastructure,
wherein the object includes a ticket owner address attribute, a ticket issuer address attribute, a key issuer address attribute and the encrypted prize code,
wherein the operations further comprise:
generating a hash of the encryption key;
encrypting the encryption key to provide an encrypted encryption key; and
storing the hash of the encryption key and the encrypted encryption key in the smart contract,
wherein the encryption key comprises a public key of the key issuer (PubKeyKI) that is associated with a private key of the key issuer (PrivKeyKI), and wherein encrypting the encryption key comprises encrypting the encryption key using a public key of the ticket issuer (PubKeyTI) that is associated with a private key of the ticket issuer (PrivKeyTI), wherein the smart contract has a state attribute, and wherein the state attribute of the smart contract is set to a SELLABLE state indicating that the SILT can be sold upon creation of the smart contract.

17. The ticket issuer server of claim 16, wherein the operations further comprise:
receiving a public key of a customer (PubKeyC);
decrypting the public key PubKeyKI of the key issuer;
encrypting the encryption key using the public key PubKeyC of the customer to provide a new encrypted encryption key;
storing the new encrypted encryption key in the smart contract; and
setting the state attribute of the smart contract to a SELLING state indicating that the SILT is in the process of being sold.

18. The ticket issuer server of claim 16, wherein the smart contract comprises a constructor function that sets values of the ticket owner address, ticket issuer address, key issuer address and encrypted prize code attributes.

19. The ticket issuer server of claim 18, wherein the constructor function sets values of a state attribute and a ticket cost attribute, and wherein the constructor function sets the value of the state attribute to a SELLABLE state indicating that the SILT can be sold.

20. The ticket issuer server of claim 16, wherein the smart contract comprises a plurality of prize codes, wherein each prize code can be revealed separately.

21. The ticket issuer server of claim 16, wherein the digital ledger comprises a private database that is managed by the ticket issuer server.

22. The ticket issuer server of claim 16, wherein the smart contract comprises an initiateSale function that is callable only by the ticket owner address, wherein the initiateSale function sets, as an owner candidate address, a value that is passed as an argument to the initiateSale function and sets the value of the state attribute to a SELLING state indicating that the SILT is in the process of being sold.

23. The ticket issuer server of claim 22, wherein the smart contract comprises a confirmSale function that is callable only by the owner candidate address, wherein the confirmSale function transfers value equal to the ticket cost attribute to the ticket owner address, sets the owner attribute to the owner candidate address, and sets the value of the state attribute to the SELLABLE state indicating that the SILT can be sold.

24. The ticket issuer server of claim 23, wherein the smart contract comprises an initiateScratch function that is callable only by the ticket owner address using as an argument a public key of the key issuer (PubKeyKI) that is associated with a private key of the key issuer (PrivKeyKI), that was used to encrypt the prize code, and wherein the initiateScratch function sets the state attribute to a SCRATCHABLE state indicating that the SILT is ready to be scratched.

25. The ticket issuer server of claim 24, wherein the prize code comprises a first prize code, wherein the smart contract comprises a second prize code.

26. The ticket issuer server of claim 24, wherein the smart contract comprises a confirmScratch function that is callable only by the key issuer address, wherein the confirmScratch function stores a decrypted prize code in the smart contract and sets the state attribute to a SCRATCHED state indicating that the SILT has been scratched.

27. The ticket issuer server of claim 26, wherein the smart contract comprises an initiateRedeem function that is callable only by the ticket owner address and that sets the state attribute to a fifth state indicating that the SILT is being redeemed.

28. The ticket issuer server of claim 27, wherein the smart contract comprises a confirmRedeem function that is callable only by the ticket issuer address, wherein the confirmRedeem function transfers a value specified by the prize code to the owner address and sets the state attribute to a sixth state indicating that the SILT has been redeemed.

29. The ticket issuer server of claim 28, wherein the value specified by the prize code is transferred to the owner from an address associated with a designated award payer, wherein the address of the designated award payer is stored in the smart contract.

30. The ticket issuer server of claim 29, wherein the redeem function further sets the owner address attribute to the ticket issuer address.

31. The ticket issuer server of claim 24, wherein the smart contract comprises a confirmScratch function that is callable only by the key issuer address, wherein the confirmScratch function stores a copy of the decrypted prize code in the smart contract and sets the state attribute to a SCRATCHED state indicating that the SILT has been scratched.

* * * * *